(12) United States Patent
Kalia (10) Patent No.: US 6,879,480 B2
(45) Date of Patent: Apr. 12, 2005

(54) BRAKE TRANSMISSION SHIFT INTERLOCK AND PARK LOCK SYSTEM

(75) Inventor: Atul Kalia, Rochester Hills, MI (US)

(73) Assignee: Pontiac Coil, Inc., Clarkston, MI (US)

( * ) Notice: Subject to any disclaimer, the term of this patent is extended or adjusted under 35 U.S.C. 154(b) by 118 days.

(21) Appl. No.: 10/452,106

(22) Filed: Jun. 2, 2003

(65) Prior Publication Data

US 2003/0195082 A1 Oct. 16, 2003

Related U.S. Application Data

(62) Division of application No. 09/943,979, filed on Aug. 31, 2001, now Pat. No. 6,592,492.

(51) Int. Cl.[7] .............................................. H01H 47/00
(52) U.S. Cl. ........................ 361/160; 361/152; 361/154
(58) Field of Search ................................ 361/152, 154, 361/160

(56) References Cited

U.S. PATENT DOCUMENTS

| | | |
|---|---|---|
| 4,473,141 A | 9/1984 | Mochida |
| 5,036,962 A | 8/1991 | Amagasa |
| 5,076,114 A | 12/1991 | Moody |
| 5,176,231 A | 1/1993 | Moody et al. |
| 5,489,246 A | 2/1996 | Moody et al. |
| 5,562,568 A | 10/1996 | Smale |
| 5,647,465 A | 7/1997 | Burkhard et al. |
| 5,647,818 A | 7/1997 | Moody |
| 5,729,187 A | 3/1998 | Moody et al. |
| 5,738,562 A | 4/1998 | Doan et al. |
| 5,759,132 A | 6/1998 | Osborn et al. |
| 5,853,348 A | 12/1998 | Lehman |
| 5,862,899 A | 1/1999 | Dahlstrom |
| 5,902,209 A | 5/1999 | Moody |
| 6,059,687 A | 5/2000 | Durieux et al. |
| 6,425,354 B1 * | 7/2002 | Buchel et al. ............ 123/46 R |
| 6,592,492 B1 * | 7/2003 | Kalia .......................... 477/96 |

* cited by examiner

Primary Examiner—Stephen W. Jackson
(74) Attorney, Agent, or Firm—Young & Basile, P.C.

(57) ABSTRACT

A Brake Transmission Shift Interlock and Park Lock System having a shift lever, electromagnetic device, and blocking member operating with reverse logic. The system includes disabling means for disabling operation of the electromagnetic device when the shift lever is moved out of the PARK position and overriding means for manually withdrawing the blocking member from a position blocking the movement of the shift lever out of the PARK position. A time delay circuit decreases the speed of blocking member movement from the blocking position to the withdrawn position. A wire harness, including a park detection switch, electrically connects the BTSI to an automotive electrical system.

13 Claims, 5 Drawing Sheets

BRAKE TRANSMISSION SHIFT INTERLOCK AND PARK LOCK SYSTEM

CROSS-REFERENCE TO RELATED APPLICATION

This application is a divisional of U.S. Ser. No. 09/943,979, filed Aug. 31, 2001 now U.S. Pat. No. 6,592,492, and claims priority thereto.

FIELD OF THE INVENTION

This invention relates to automotive brake transmission shift interlock systems of the type including an electromagnetic device for controlling the position of a shifter blocking element.

BACKGROUND OF THE INVENTION

Modern automobiles equipped with automatic transmissions typically include a Park Lock feature and a Brake Transmission Shift Interlock (BTSI) feature. The operation of these features is controlled with respect to the position of a conventional ignition switch. With an ignition key inserted in the conventional ignition switch, the switch can be rotated to five different positions. These five positions are commonly referred to as the ACCESSORY, LOCK, OFF, RUN, and START positions. The ignition key can only be inserted into the ignition switch and removed from the ignition switch when the switch is disposed in the LOCK position. A counter-clockwise rotation of the ignition switch from the LOCK position moves the switch to the ACCESSORY position. A clockwise rotation of the ignition switch from the LOCK position moves the switch to the OFF, RUN, and START positions respectively.

Conventional automatic transmissions include a shifter or shift lever for selecting one of seven different operating positions. These operating positions are commonly referred to as the PARK, REVERSE, NEUTRAL, DRIVE, SECOND, and FIRST positions. An OVERDRIVE position is also provided for some transmissions.

The Park Lock feature is designed to prohibit movement of the shift lever from the PARK position unless the ignition switch is disposed in the RUN position. The Brake Transmission Shift Interlock feature is designed to prohibit movement of the shift lever from the PARK position unless the ignition switch is disposed in the RUN position and the brake pedal is depressed. With the ignition switch disposed in the RUN position, the BTSI feature is disabled when the brake pedal is sufficiently depressed to activate the brake light switch. When the BTSI feature is disabled, the shift lever may be removed from the PARK position.

As a result, a vehicle equipped with an automatic transmission cannot be placed in a condition to power the drive wheels in either a reverse or forward direction until the steering wheel has been freed for normal driving by release of the Park Lock feature and the driver has immobilized the vehicle by placing his or her foot on the brake pedal. In addition, the vehicle cannot be placed in NEUTRAL unless the key is in the ignition. This is a desired feature especially if the vehicle is parked on a slope as it could begin rolling down the slope if the vehicle is placed in NEUTRAL. It is generally believed that this combination of safety interlocks is effective in reducing accidental or inadvertent movement of a vehicle.

SUMMARY OF THE INVENTION

A first aspect of the invention is the use of the so-called "reverse logic" to implement a BTSI using an electromagnetic device to position a blocking member to either interfere with or allow movement of the shift lever from the PARK position. It should be understood that the term "shift lever", as used in this specification, is intended to embrace all known devices for "selecting" the operating condition of an automatic transmission including column-mounted levers working in conjunction with conventional PRNDL plates, console-mounted levers with any of various types of release mechanisms, and pushbutton selectors used in combination with what are often called "shift by wire" systems.

Conventional logic powers up the electromagnetic device to place the blocking member in the interfering position as soon as the ignition switch is turned on. Depression of the brake pedal de-energizes the electromagnetic device and a mechanical spring moves the blocking member out of the interfering position.

The present device reverses these conditions; i.e., the position of the blocking member, usually a metal pin, which corresponds with the unpowered condition of the BTSI is such as to inhibit or prevent movement of the shift lever out of the PARK position; consequently, depression of the brake pedal is required to power up the electromagnetic device to actively unblock the shift lever.

To permit the shift lever to be moved out of the PARK position when the battery is dead or an ignition key not available, an integral manual override mechanism is provided to permit the vehicle owner or a service person to manipulate a small lever attached to the housing of the BTSI to pull the blocking pin away from the blocking position against the force of the bias spring.

A second aspect of the invention is the provision of a "disable" function for the electromagnetic device which interrupts the circuit to the device whenever the shift lever is in any position other than PARK. This eliminates the possibility of cycling the electromagnetic device during normal vehicle operation along with the clicking noise and radio interference which is associated therewith. In the preferred embodiment hereinafter described, the disable function is achieved by means of a Hall effect device mounted on the BTSI housing immediately opposite a permanent magnet on a peripheral surface of the shifter crank member such that the permanent magnet only faces and influences the Hall effect device when the crank is in the PARK position. Of course, other proximity switches, both contacting and non-contacting types, can be used for this purpose.

Another aspect of the invention involves the use of a wiring harness concept to facilitate installation of the BTSI and, in the preferred embodiment, a park detection switch (PDS) as a convenient combination. This is accomplished by replacing the normal soldered or brazed connection between the BTSI circuit board and the wires leading therefrom with a header and co-packaging therewith a park detection switch such that the wiring for the BTSI circuit board and the park detection switch run through a common harness sleeve to a multi-pin plug connector which is conveniently plugged into the automobile electrical system to make intelligence conveying contact with the ignition switch, the brake light switch and the battery.

A further aspect of the invention is the provision of an improved park detection switch which can be "snapped mounted" on the PRNDL plate or some other convenient location in close proximity to the BTSI housing by means of a shaped plug which dictates the proper position and simple bayonet type prongs which eliminate the need for rivets and other labor intensive fasteners.

Still another aspect of the invention is a time delay circuit for decreasing the speed of blocking member movement from the blocking or interfering position to the non-interfering position. The time delay circuit provides a less noisy or more quiet operation of the system.

DETAILED DESCRIPTION OF THE ILLUSTRATIVE EMBODIMENT

Figure 1:
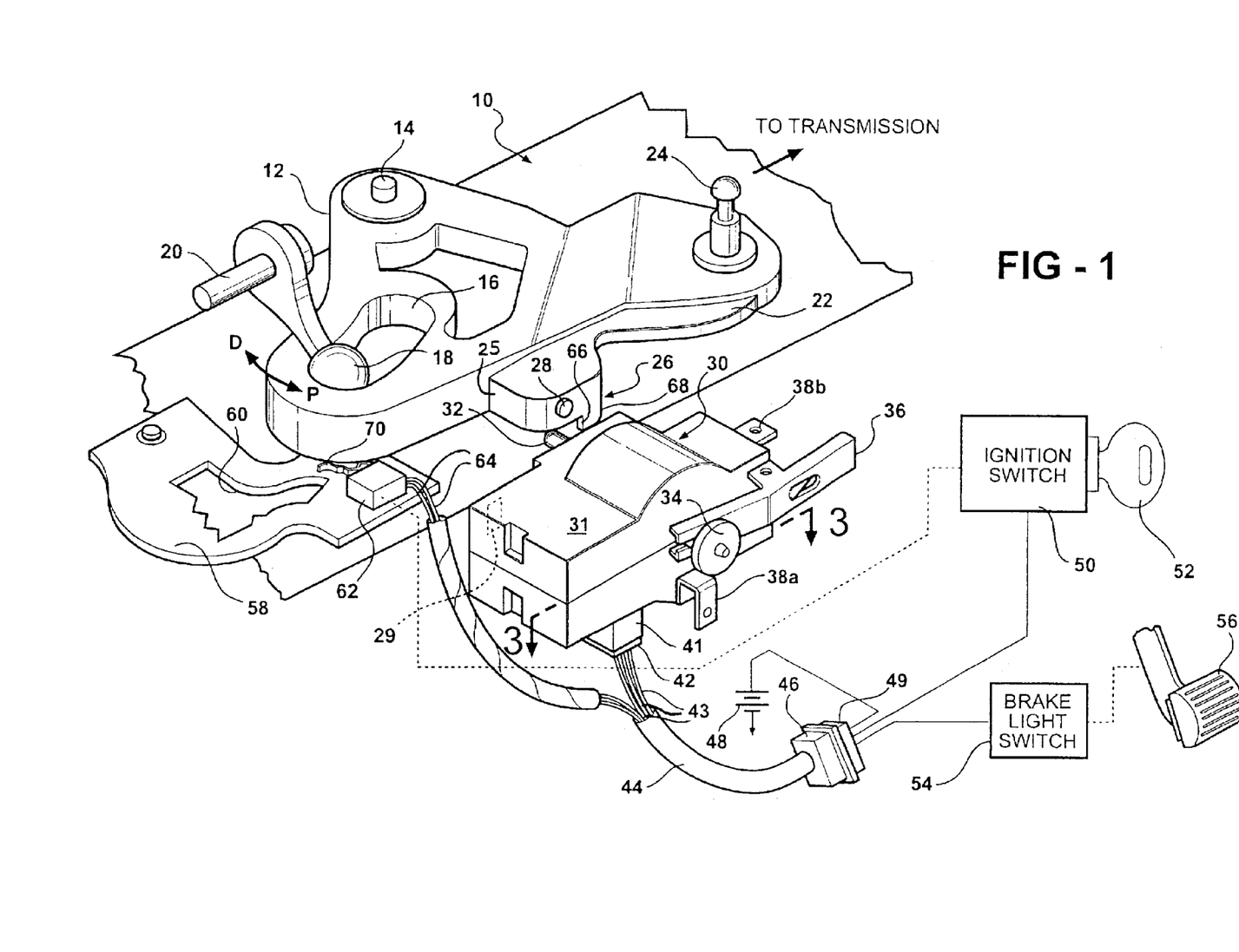
FIG. 1 is a perspective view, partially schematized, of a combined BTSI and Park Lock system embodying the aforementioned features of the present invention in a state of the art steering column-mounted shift lever system for a vehicle equipped with an automatic transmission, a conventional key type ignition switch and a conventional pedal-operated braking system.

Referring to FIG. 1 there is shown a representative portion of a conventional automotive vehicle steering column 10 having a conventional shift lever crank member 12 mounted thereon by means of pivot 14. The crank member 12 is formed with a shaped cam opening 16 which receives a ball 18 which is mechanically attached to the shift lever 20 to be moved in the indicated directions to and from the PARK (P) position and to cause associated pivotal motion of the crank member 12 as a consequence thereof The distal portion 22 of the crank member 12 is fitted with a snap on connector 24 to receive a mechanical push-pull cable which connects the crank member 12 to the transmission. Projection 25 of the crank member 12 is provided with a downwardly directed extension 26 which operates with a blocking/unblocking member or pin 32 of the electromagnetic device 74 (illustrated in FIGS. 3a and 3b) in the BTSI 30 in the manner hereinafter described. The permanent magnet 28 is mounted on the projection 25 to influence a Hall effect device 29 mounted on the BTSI housing 31 for purposes to be described.

The molded plastic BTSI housing 31 is mounted on the steering column 10 by means of brackets 38a and 38b positioning the blocking pin 32 directly in the path of the extension 26 when the armature 75 (illustrated in FIGS. 3a and 3b) in the BTSI 30 is in the de-energized position as hereinafter explained in this reference to FIGS. 3a and 3b; i.e., the pin 32 blocks movement of the extension 26 and prevents the crank member 12 from moving in a clockwise direction which is necessary to selectively take the vehicle transmission out of PARK (P) and move it toward the REVERSE and/or DRIVE positions. Excitation of the coil in the BTSI housing 31 withdraws the blocking pin 32 to allow such clockwise movement to occur.

Figure 3A:
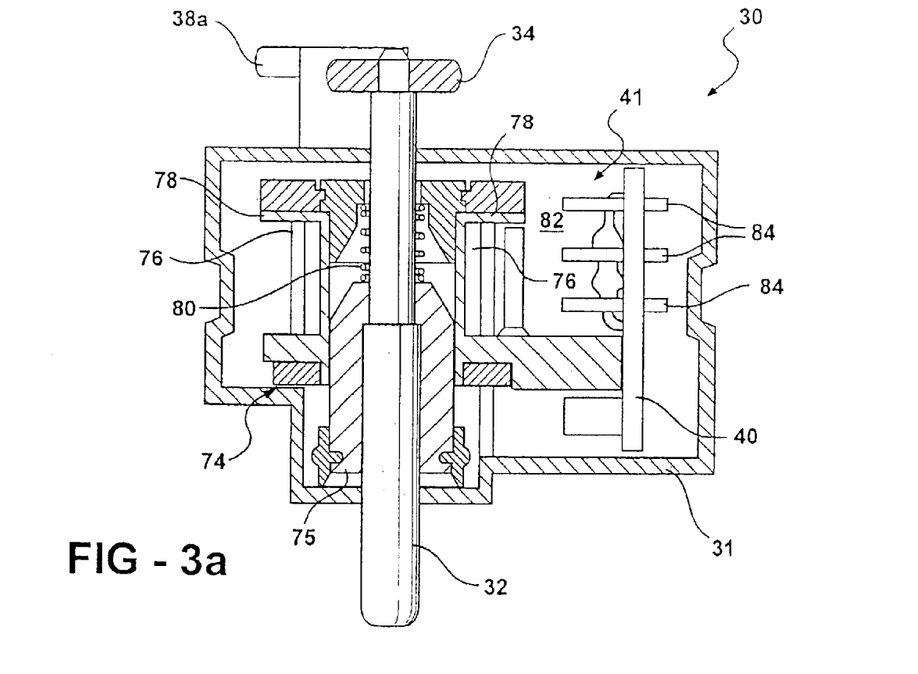
FIG. 3a is a cross-sectional view of the BTSI taken along lines 3—3 in FIG. 1 showing a blocking member in an extended position.
Figure 3B:
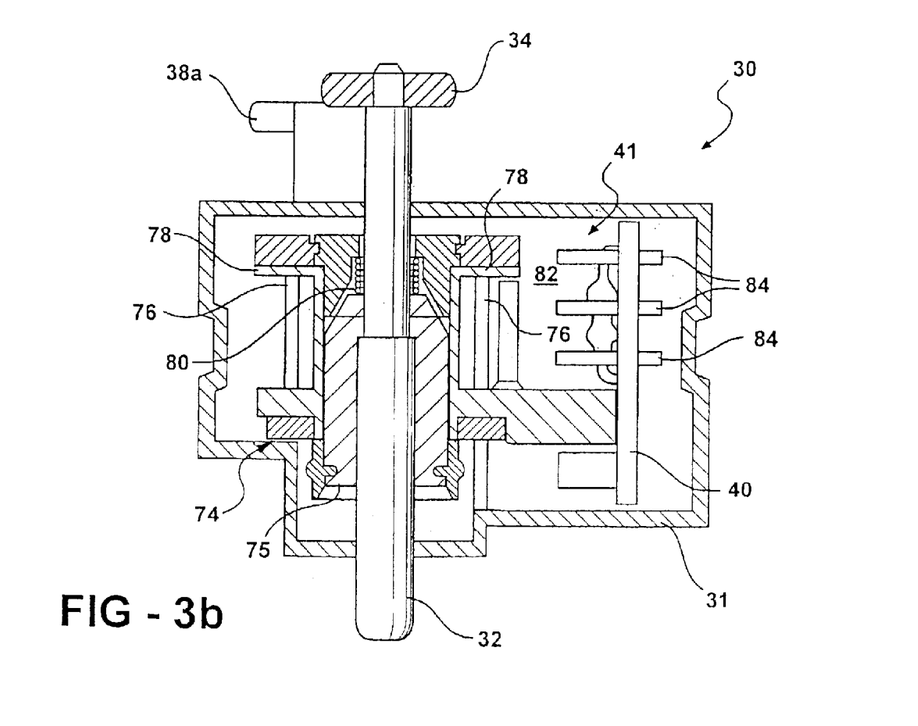
FIG. 3b is a cross-sectional view of the BTSI taken along lines 3—3 in FIG. 1 showing the blocking member in a withdrawn position.

The pin 32 is part of an armature assembly which extends through the BTSI 30 as shown in FIGS. 3a and 3b to an enlarged head 34 which is external of the housing 31 as shown in FIG. 1. A molded plastic override lever 36 has a portion thereof located under the head 34 to provide a manual override feature whereby the pin 32 may be withdrawn from the blocking position relative to extension 26 without the need to excite the coil in the BTSI housing 31.

The BTSI housing 31 carries a circuit board 40 (illustrated in FIGS. 2, 3a, and 3b) wired to a header 41. Preferably, the header 41 is integrally molded in the BTSI housing 31. A wiring harness 44 electrically connects the BTSI 30 to an automotive electrical system. Preferably, the wiring harness 44 is sleeve-covered. The wiring harness 44 (illustrated in FIG. 2) includes a first connector 42, a second connector 46, and three wires 43 routed between the first connector 42 and the second connector 46. The first connector 42 is connectible to the header 41. The second connector 46 is connectible to the automotive electrical system through an automotive electrical system connector 49. The automotive electrical system includes the battery 48, a conventional ignition switch 50 the cylinder of which is operated by a key 52 and to the brake light switch 54 which is activated by depression of the conventional brake pedal 56.

The steering column 10 is provided with a conventional PRNDL plate 58 having a detent type opening 60 formed therein. The plate 58 carries a park detection switch 62 further illustrated in FIG. 5 to include a flexible metal pin actuator 70 the inboard portion of which operates a microswitch button 72, illustrated in FIG. 5, in the body of switch 62. The detection switch 62 is activated and deactivated as the switch 62 is in and out of PARK on the plate 58. This electrical signal is transmitted by way of two wires 64 which, in accordance with the packaging aspect of the present invention, co-package with the wires 43 into the harness 44 and are permanently associated with the second connector 46 on the opposite end of the wiring harness. This permits the wiring harness 44 with the three wires 43 and two wires 64, the first connector 42, the switch 62, and the second connector 46 to be manufactured as a single unit which is conveniently installed after the BTSI housing 31 has been attached to the steering column 10 and the automotive electrical system fully assembled. The final step in this installation is the snap-in installation of the switch 62. The first connector 42 is plugged in before the BTSI is installed in the column.

Describing the normal operation of the assembly thus far described, the vehicle equipped with steering column 10 is normally approached by the operator with the transmission in the PARK position, the ignition switch 50 locked and the battery 48 disconnected from the electrical components illustrated in FIG. 1. Under these conditions, because of the "reverse logic" described above, the unpowered BTSI armature 75 serves no electrical influence on the position of the blocking pin 32. It is therefore controlled by the bias spring 80 (illustrated in FIGS. 3a and 3b) and it is urged in the blocking position relative to extension 26 such that clockwise pivotal motion of the crank member 12 about the pivot 14 is prevented.

The operator enters the automobile, places the key 52 in the ignition switch 50 and rotates the ignition switch toward the RUN and START positions. This connects the battery 48 and all of the electrical components illustrated in FIG. 1 and sends a first enable signal to the BTSI circuit board 40 by way of the wiring harness 44. Even after the vehicle is started running, however, it will not be possible to operate the shift lever 20 until the operator presses the brake pedal 56 closing the circuit through the brake light switch 54 and providing a second enable signal to the BTSI logic board 40 through the connector 46 and the wiring harness 44. When all signals are thus received the electromagnetic device 74 in the BTSI housing 31 withdraws the blocking pin 32 from the position shown thereby permitting clockwise rotation to the crank member 12 about the pivot pin 14 toward one of the REVERSE, NEUTRAL or DRIVE positions.

The extension 26 includes a stop edge 66 and ramped or inclined surface 68. With the blocking pin 32 in the normally extended position and the shift lever 20 in the PARK position, clockwise rotation of the crank member 12, and thus removal of the shift lever 20 from the PARK position, is prohibited when the stop edge 66 catches the blocking pin 32.

The blocking pin 32 is retracted from the blocking position to the withdrawn position when the ignition switch 50 is disposed in the RUN position and the brake pedal 56 is sufficiently depressed to close the brake light switch 54. With the blocking pin 32 in the withdrawn position and the shift lever 20 in the PARK position, the extension 26 is rotated in a clockwise direction past or beyond the blocking pin 32 as the shift lever 20 is moved from the PARK position to a non-PARK position (i.e. the REVERSE, NEUTRAL, OVERDRIVE, DRIVE, SECOND, or FIRST position). Once the brake pedal 56 is released, the blocking pin 32 is urged back to its normally extended position by the bias spring 80.

With the blocking pin 32 in the extended position and the shift lever 20 in a non-PARK position, counter clockwise rotation of the crank member 12, resulting from movement of the shift lever 20 from a non-PARK position to the PARK position, causes the ramped surface 68 of the extension 26 to meet and contact the extended blocking pin 32. The inclined surface 68 is designed to ramp or guide the blocking pin 32 from the extended position towards the withdrawn position, against the operation of the bias spring 80, as the extension 26 rotates by the blocking pin 32. Once the extension 26 has rotated in a counter clockwise direction beyond the blocking pin 32, the pin 32 is once again urged back to its normally extended position by the bias spring 80.

Clockwise motion of the crank member 12 takes the permanent magnet 28 out of proximal relationship to the Hall effect device 29 to deactivate or disable the BTSI armature 75 through the logic board 40 such that the BTSI armature 75 can not be cycled by repeated depression of the brake pedal during normal operation of the vehicle. In this manner, the disable function prevents the production of a clicking noise as well as electromagnetic interference (EMI) and radio-frequency interference (RFI) created if the electromagnetic device 74 is cycled between the energized and de-energized states as the brake pedal 56 is depressed and released respectively during normal vehicle operation.

If at any time the vehicle transmission selector lever 20 is repositioned in the PARK position, the permanent magnet 28 is again placed in proximal relationship to the Hall effect device 29 to reactivate or enable the BTSI armature 75. The brake pedal 56 must be depressed before the crank member 12 may again be rotated into a clockwise direction. The park detection switch 62 is operative through a conventional device not shown to prevent rotation of the cylinder in the ignition switch 50 during normal operation of the vehicle.

If for any reason the BTSI 30 fails or the battery 48 of the vehicle is dead, removed, or disconnected, or if the key 52 cannot be found, the manual override lever 36 is used to withdraw the pin 32 to permit the shift lever 20 to be moved to the NEUTRAL position such that the vehicle may be pushed or towed for short distances as may be necessary for service or other emergencies.

Figure 2:
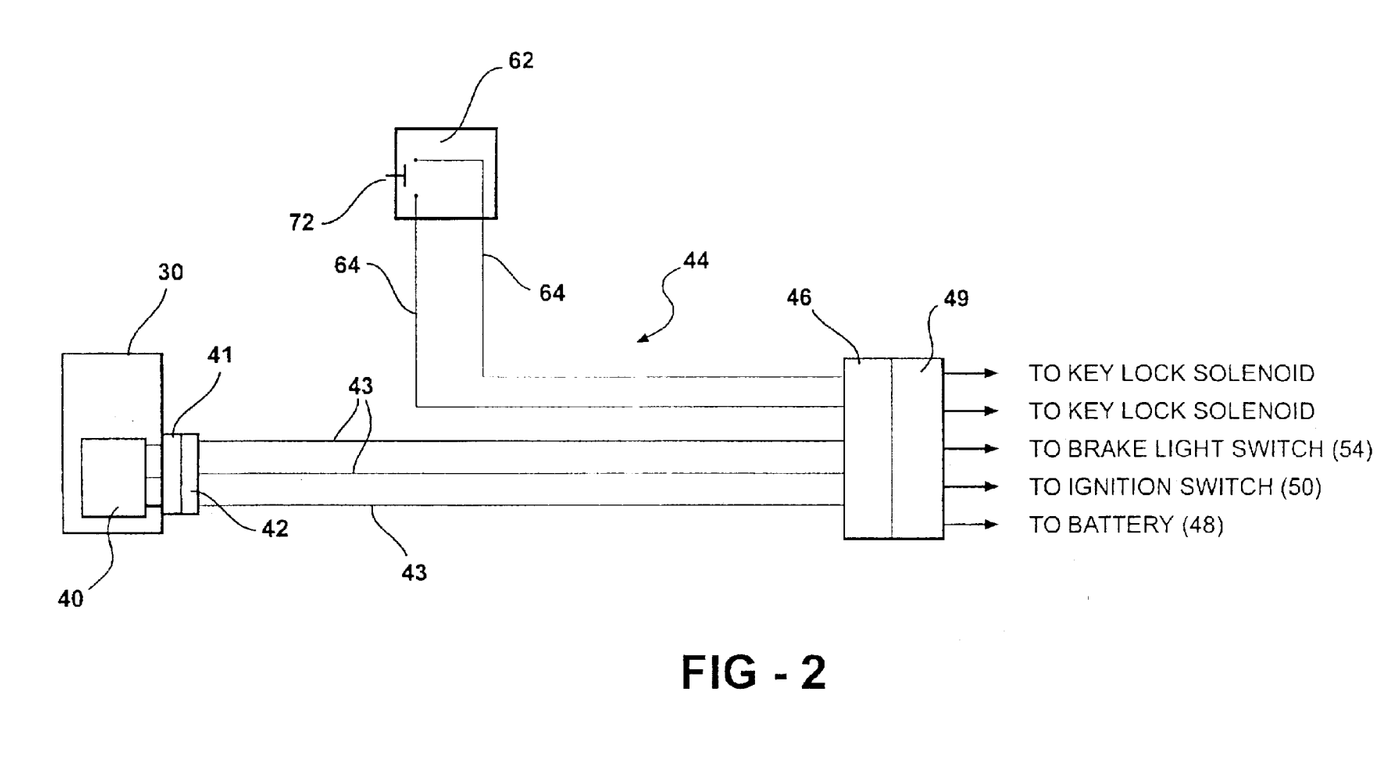
FIG. 2 is a schematic diagram of a wiring harness for use in the combined BTSI and Park Lock system.

FIG. 2 is a schematic diagram of the wiring harness 44. The circuit board 40 in the BTSI 30 receives power, the first enable signal representing ignition switch RUN position, and the second enable signal representing brake pedal depression or brake light switch closure from the automotive electrical system by way of the three wires 43. The three wires 43 are routed between the first connector 42 and the second connector 46. The first connector 42 is connected to the header 41. The header 41 is hard wired to the logic board 40. The second connector 46 is connected to the automotive electrical system connector 49.

The park detection switch 62 provides a signal indicating that the transmission is in the PARK position. The PARK position signal is provided to the automotive electrical system by way of the two wires 64. The PARK position signal is sent to the key lock solenoid. The PARK position signal is produced when the micro-switch button 72 is closed as described above.

FIG. 3a is a cross-sectional view of the BTSI 30 taken along lines 3—3 in FIG. 1 showing the blocking member 32 in the extended position. The electromagnetic device 74 is contained within the BTSI housing 31. The electromagnetic device 74 includes the armature 75, the coil 76, and a bobbin 78. The coil 76 is wound about the bobbin 78. When the electromagnetic device 74 is de-energized, the spring 80 biases the blocking member 32 to the normally extended position. The head 34 is snap-mounted to the blocking member 32. The bracket 38a is integrally molded to the housing 31. The header 41, which extends outward from the back of the housing 31 as illustrated in FIG. 3a, includes a plastic connector portion 82 and three metal leads 84. Each metal lead 84 has one end soldered to the logic board 40 and the opposite end extending through the plastic connector portion 82 for exposure external to the BTSI 30.

FIG. 3b is a cross-sectional view of the BTSI 30 taken along lines 3—3 in FIG. 1 showing the blocking member 32 in the withdrawn position. When the electromagnetic device 74 is energized, current flows through the coil 76 magnetizing the armature 75 and attracting the blocking member 32 to the withdrawn position.

Figure 4:
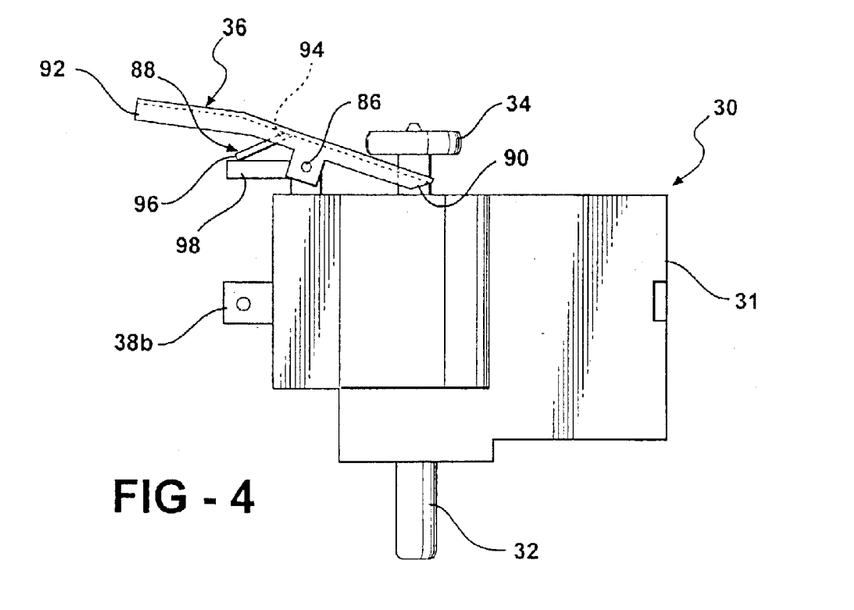
FIG. 4 is a side view of the BTSI showing a manual override feature.

FIG. 4 is a side view of the BTSI 30 showing the manual override feature. The manual override feature includes the lever 36, a fulcrum 86, and a biasing finger 88. The lever 36 has two ends, a proximal end 90 located under the head 34 of the blocking pin 32 and a distal end 92 located opposite the proximal end 90. The lever 36 is rotatably connected to the fulcrum 86 between the proximal end 90 and the distal end 92. The biasing finger 88 urges the lever 36 to a normally neutral position wherein the lever 36 does not influence the position of the blocking pin 32. Depression of the distal end 92 of the lever rotates the lever 36 about the fulcrum 86 forcing the proximal end 90 of the lever and the head 34 of the blocking pin 32 away from the BTSI 30 thereby retracting the blocking pin 32 from the blocking position to the withdrawn position. The fulcrum 86 is integrally molded to the BTSI housing 31. The bias finger 88 is formed or punched from the body of the lever 36 thereby creating a living hinge at one end 94 of the finger 88. The opposite end 96 of the biasing finger 88 acts against an extended planar portion 98 of the fulcrum 86.

Figure 5:
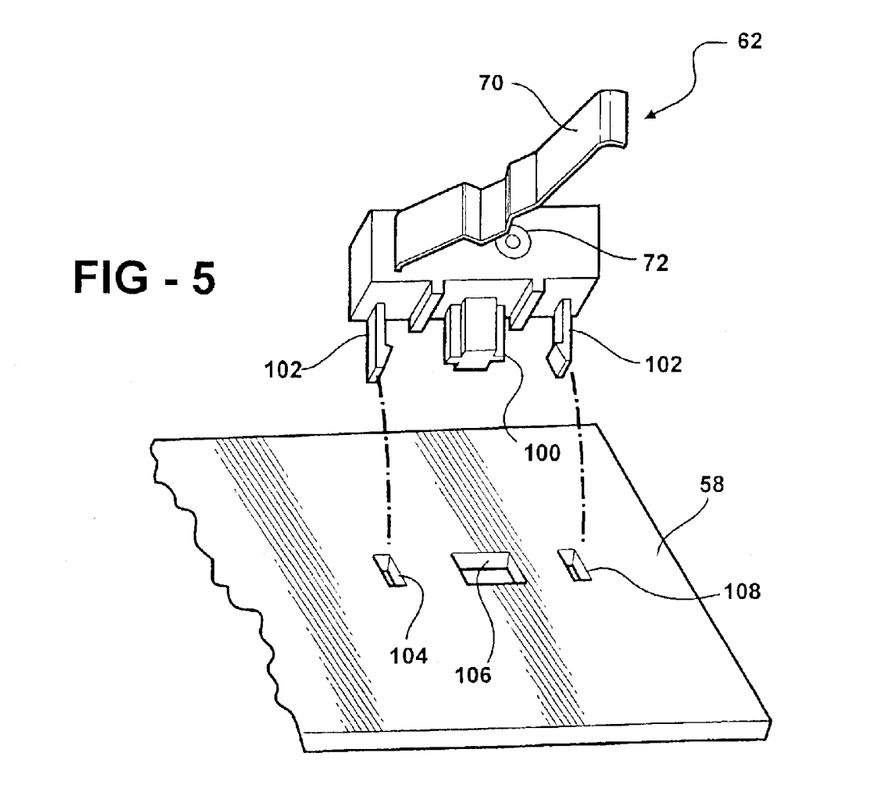
FIG. 5 is a perspective view of a park detection switch positioned for installation to a PRNDL plate.

FIG. 5 is a perspective view of the park detection switch 62 oriented for installation to the PRNDL plate 58. The park detection switch 62 includes the flexible metal pin actuator 70 the inboard portion of which operates the micro-switch button 72 in the body of switch 62. The park detection switch 62 is designed to be snap-mounted on the PRNDL plate 58 or some other convenient location in close proximity to the BTSI housing 31 by means of a rectangular shaped plug or post 100 which dictates the proper position and simple bayonet type prongs 102 which eliminate the need for rivets and other labor intensive fasteners. The park detection switch 62 requires three mounting holes 104, 106, and 108. The center hole 106 is adapted to receive the rectangular shaped post 100. The post 100 provides the bulk of the mechanical connection to the plate 58. Further, the rectangular shape of the post 100 prevents the park detection switch 62 from rotating. The outer holes 104 and 108 are adapted to receive and retain the bayonet type prongs 102. In this manner, the park detection switch 62 can be snap-mounted to the plate 58.

Figure 6:
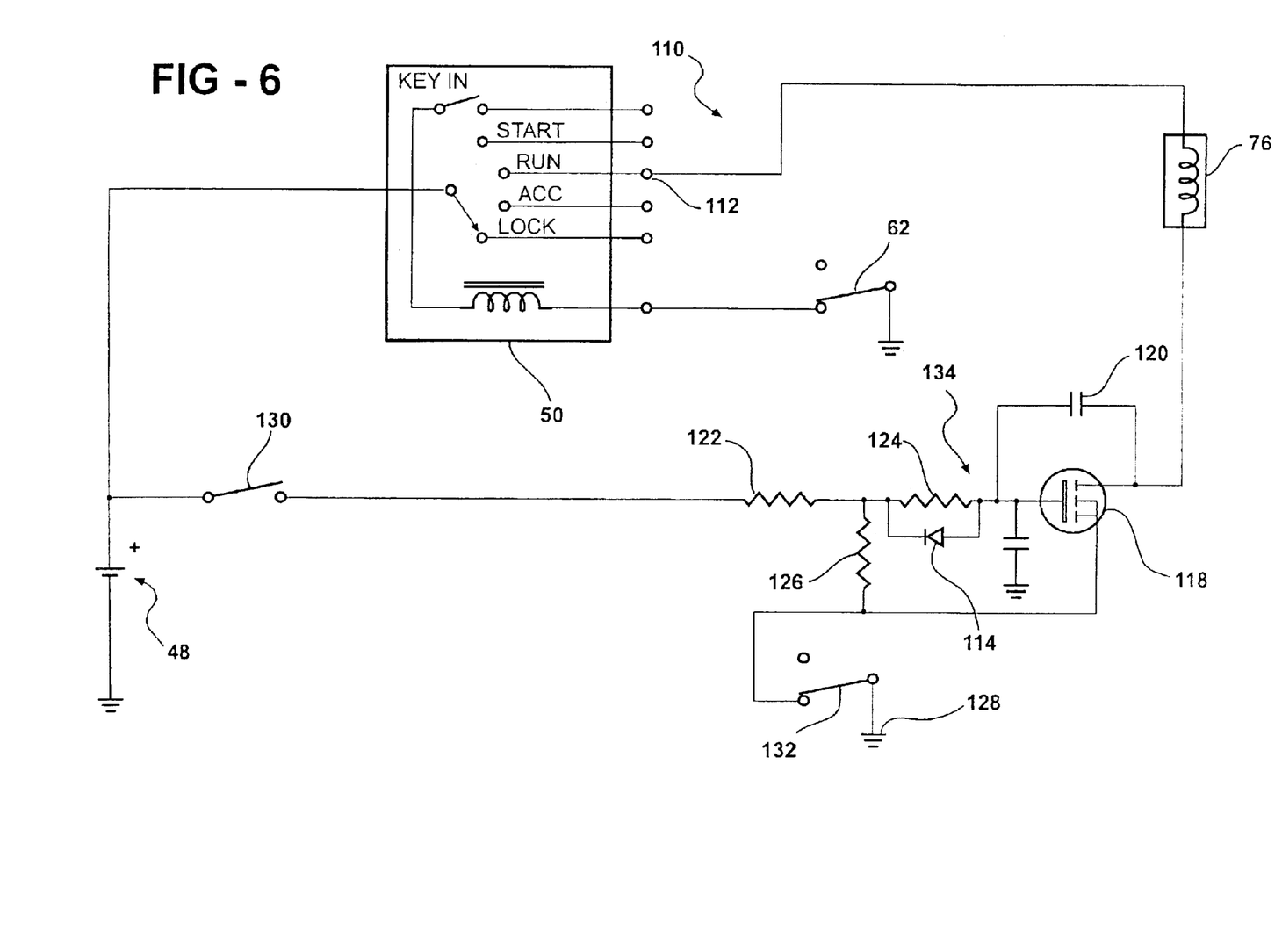
FIG. 6 is an electrical schematic of the combined BTSI and Park Lock system.

FIG. 6 is an electrical schematic of the combined BTSI and Park Lock system for controlling the position of the blocking member 32 through operation of the coil 76 in the electromagnetic device 74. In the electrical schematic, the BTSI disabling means, described above as including the Hall effect device 29 and the magnet 28, has been replaced with a BTSI shutoff switch 132. The BTSI shutoff switch 132 is closed when the shift lever 20 is disposed in the PARK position and opened when the shift lever 20 is moved out of the PARK position.

The present invention includes a time delay circuit 110 having a diode 114, a field-effect (FET) transistor 118, a capacitor 120, and first, second, and third resistors 122, 124, and 126. Each component of the time delay circuit 110 is mounted on the circuit board 40 in the BTSI housing 31. The time delay circuit 110 further includes an input node 112 which receives power from the battery 48 only when the ignition switch 50 is disposed in the RUN position.

With the ignition switch 50 is disposed in the RUN position, the combined BTSI and Park Lock system is designed to control the position of the blocking member 32 in response to the opening and closing of an input switch 130. Similar to the brake light switch 54, the input switch 130 is closed when the brake pedal 56 is depressed and open when the brake pedal 56 is released. In this circuit design, the transistor 118 is operated as a switch to control the flow of current from the drain to the source of the transistor 118 and, thus, control the flow of current through the coil 76. More specifically, the transistor 118 is operated in one of three modes including a cutoff mode permitting zero current flow through the transistor 118, a saturation mode permitting current flow which increases from minimum current flow up to maximum current flow through the transistor 118, and an active mode permitting maximum current flow through the transistor 118.

Normally, the electromagnetic device 74 is de-energized and the spring 80 biases the blocking member 32 to the extended or blocking position. When the input switch 130 is closed, an input voltage signal is transmitted from the input switch 130 through the first and second resistors 122 and 124 to the transistor 118. The input voltage signal operates the transistor 118 in the active mode or, in other words, a conducting or closed state. With the transistor 118 in the active mode, current flows from the input node 112 through the first diode 114, the coil 76, the transistor 118, and the BTSI shutoff switch 132 to ground 128. The current flow through the coil 76 magnetizes the armature 75 and attracts the blocking member 32 from the extended or blocking position to the withdrawn position.

When the input switch 130 is opened, no input voltage signal is transmitted to the transistor 118 and, thus, the transistor 118 is operated in the cutoff mode or, in other words, a non-conducting or open state. With the transistor 118 operated in the cutoff mode, no current flows through the coil 76. As a result, the armature 75 is demagnetized permitting the spring 80 to bias the blocking member 32 from the withdrawn position to the extended or blocking position.

The capacitor 120 and the first, second, and third resistors 122, 124, 126 are connected so as to form a RC circuit 134 between the input switch 130 and the transistor 118. Transmission of the input voltage signal through the RC circuit 134 increases magnitude of the input voltage signal from zero voltage to maximum voltage and, as a result, the transistor 118 is operated more slowly from the cutoff mode through the saturation mode to the active mode. Because the transistor 118 is operated for a longer period of time in the saturation mode, the speed of blocking member movement from the extended position to the withdrawn position is decreased. In this manner, the time delay circuit 110 provides a less noisy or more quiet operation of the BTSI 30. In a preferred embodiment of the present invention, the values of the capacitor 120, and the first, second and third resistors 122, 124 and 126 within the RC circuit 110 are selected to increase or extend the time the blocking member 32 takes to move from the extended position to the withdrawn position by approximately 400 milliseconds.

What is claimed is:

1. A brake transmission shift interlock comprising:
   a blocking member having a first position and a second position;
   a spring for biasing the blocking member toward the first position;
   actuation means for moving the blocking member against the bias of the spring to the second position in response to an input signal; and
   time delay means for controlling a speed of blocking member movement as the blocking member is moved from the first position to the second position.

2. The brake transmission shift interlock set forth in claim 1 wherein the actuation means includes an electromagnetic device having a coil for receiving current and magnetizing an electromagnet to move the blocking member to the second position.

3. The brake transmission shift interlock set forth in claim 2 wherein the actuation means further includes a switch for controlling current flow through the coil.

4. The brake transmission shift interlock set forth in claim 3 wherein the switch is closed to enable current flow through the coil.

5. The brake transmission shift interlock set forth in claim 4 wherein the time delay means includes a RC circuit for receiving the input signal and varying a voltage level of the input signal transmitted to the switch from minimum voltage to maximum voltage to decrease the speed of blocking member movement from the first position to the second position.

6. The brake transmission shift interlock set forth in claim 3 wherein the switch is a transistor operated in one of a cutoff mode enabling zero current flow through the coil, a saturation mode enabling current flow through the coil varying from minimum current flow up to maximum current flow, and an active mode enabling maximum current flow through the coil.

7. The brake transmission shift interlock set forth in claim 6 wherein the transistor is operated sequentially from the cutoff mode through the saturation mode to the active mode in response a voltage level of the input signal increasing from zero voltage to maximum voltage.

8. The brake transmission shift interlock set forth in claim 7 wherein the time delay means includes a RC circuit for receiving the input signal and varying the voltage level of the input signal transmitted to the switch from minimum voltage to maximum voltage to decrease the speed of blocking member movement from the first position to the second position.

9. The brake transmission shift interlock set forth in claim 1 wherein the spring biases the blocking member outward from the interlock to the first position and the actuation means withdraws the blocking member into the interlock to the second position.

10. The brake transmission shift interlock set forth in claim 1 including overriding means for manually overriding the spring.

11. The brake transmission shift interlock set forth in claim 1 including disabling means for selectively disabling the actuation means.

12. The brake transmission shift interlock set forth in claim 1 including a header in electrical communication with the actuation means and the time delay means, and a wiring harness including a first conductor for conveying a first signal, a second conductor for conveying a second signal, a third conductor for conveying power, a first connector connectable with the header and a second connector connectable to an automotive electrical system, the first, second, and third conductors extending between the first and second connectors and being bound together as a unit.

13. The brake transmission shift interlock set forth in claim 12 including a park detection switch and fourth and fifth conductors in electrical communication with the park detection switch, the fourth and fifth conductor routed between the park detection switch and the second connector and bound in the wiring harness with the first, second, and third conductors.

* * * * *